(12) United States Patent
Thomas, III

(10) Patent No.: US 6,292,319 B1
(45) Date of Patent: Sep. 18, 2001

(54) THIN RETROREFLECTIVE MARKER FOR IDENTIFYING AN OBJECT

(75) Inventor: Fred C. Thomas, III, Kaysville, UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/229,805

(22) Filed: Jan. 13, 1999

Related U.S. Application Data

(63) Continuation of application No. 08/833,032, filed on Apr. 13, 1997, now Pat. No. 5,986,838, which is a continuation-in-part of application No. 08/388,242, filed on Feb. 14, 1995, now Pat. No. 5,638,228.

(51) Int. Cl.$^7$ .................................................. G11B 15/04
(52) U.S. Cl. .............................. 360/60; 360/132; 360/69; 359/529; 250/559.44; 250/550; 250/237 G; 250/559.15; 250/559.16
(58) Field of Search .............................. 250/559.44, 550, 250/237 G, 559.01, 559.15, 559.16, 559.17; 359/529, 530, 601, 742; 242/344; 369/272, 274; 360/133, 132, 60, 69, 71

(56) References Cited

U.S. PATENT DOCUMENTS

| 3,718,078 | 2/1973 | Plummer . |
| 3,727,045 | 4/1973 | Warren et al. . |

(List continued on next page.)

FOREIGN PATENT DOCUMENTS

| 33 39 655 | 3/1994 | (DE) . |
| 0 230 752 | 12/1986 | (EP) . |
| 0 210 629 | 2/1987 | (EP) . |
| 0 565 281 A2 | 10/1993 | (EP) . |
| 58-097167 | 6/1983 | (JP) . |
| WO/96/25737 | 8/1996 | (WO) . |
| WO/97/19449 | 5/1997 | (WO) . |

OTHER PUBLICATIONS

"Experiments with retrodirective arrays", By S. F. Jacobs, Optical Engineering, vol. 21, No. 2, Mar./Apr. 1982.*
Patent Abstracts of Japan, vol. 008 (163), Jul. 27, 1984, of Publication No. JP 59 058630 A, published Apr. 4, 1984.
Reflexite Corporation Brochure NA1010, "Refectors for Photoelectric Controls", Apr. 1993, 4 pages.
Leaner, J.S., Shie, R., Petersen, J., "Holographic Light Shaping Diffuses", presented at The Aerospace Lighting Institute, Advanced Seminar, Feb. 1994, Los Angeles, CA, 4 pages.
Physical Optics Corporation Brochure JLL–493, "Light Shaping Diffusers", 2 pages.
The Optometrics Group Catalog, "Optical Components & Instruments Catalog—Gratings", 1996, 28–35.
Kathman, A. et al., "Binary Optics: New Diffractive Elements for the Designer's Tool Kit", The Photonics Design & Applications Handbook®, Laurin Publishing Co., Inc., 1994 (Book 3), H358–H360.

(List continued on next page.)

Primary Examiner—Alan T. Faber
(74) Attorney, Agent, or Firm—Woodcock Washburn Kurtz Mackiewicz & Norris LLP

(57) ABSTRACT

A cartridge for a data storage disk drive has a thin retroreflective marker. Light from a source is reflected from the marker almost exactly on its incident path. A planar light shaping optical structure such as a holographic light shaping diffuser (LSD) ruled or blazed diffraction grating, holographic diffraction grating, binary optics or holographic diffraction grating directs light to the detector. The LSD has degrees of angular diffusion in different orthogonal axes. This property makes possible unique identification of different types of cartridges.

30 Claims, 5 Drawing Sheets

U.S. PATENT DOCUMENTS

| | | | |
|---|---|---|---|
| 3,893,772 | * 7/1975 | Le Tilly et al. | 359/159 |
| 3,986,612 | * 10/1976 | Kamm et al. | 250/569 |
| 3,995,376 | 12/1976 | Kimble et al. . | |
| 4,080,899 | 3/1978 | Luban . | |
| 4,102,059 | 7/1978 | Kimble et al. . | |
| 4,244,683 | 1/1981 | Rowland . | |
| 4,332,847 | 6/1982 | Rowland . | |
| 4,498,882 | 2/1985 | Evert . | |
| 4,578,042 | 3/1986 | Evert . | |
| 4,592,554 | 6/1986 | Gilbertson et al. . | |
| 4,607,978 | 8/1986 | Eigenmann . | |
| 4,633,451 | 12/1986 | Ahn et al. . | |
| 4,649,264 | 3/1987 | Carson . | |
| 4,652,172 | 3/1987 | Eigenmann . | |
| 4,683,824 | 8/1987 | Gibbs . | |
| 4,762,292 | 8/1988 | D'Anci . | |
| 4,783,672 | 11/1988 | Wirtz et al. . | |
| 5,038,359 | 8/1991 | Pepper . | |
| 5,069,577 | 12/1991 | Murphy . | |
| 5,084,883 | 1/1992 | Khalid et al. . | |
| 5,159,560 | 10/1992 | Newell et al. . | |
| 5,206,869 | 4/1993 | Khalid et al. . | |
| 5,325,243 | 6/1994 | Rath et al. . | |
| 5,491,586 | 2/1996 | Phillips . | |
| 5,638,228 | 6/1997 | Thomas . | |
| 5,650,891 | 7/1997 | Thayne et al. . | |
| 5,809,520 | 9/1998 | Edwards et al. . | |
| 5,986,838 | * 11/1999 | Thomas, III | 360/60 |

OTHER PUBLICATIONS

Loewen, E.G., "Diffraction Gratings: Selection of Size and Type for Different Applications", The Photonics Design & Applications Handbook®, Laurin Publishing Co., Inc., 1994 (Book 3), H362–H365.

Faklis, D. et al., "Optical Design/Diffractive Lenses: Taking Advantage of Diffractive Optics to Reduce Size, Weight and Cost", The Photonics Design & Applications Handbook®, Laurin Publishing Co., Inc., 1994 (Book 3), H386–H390.

* cited by examiner

FIG. 4
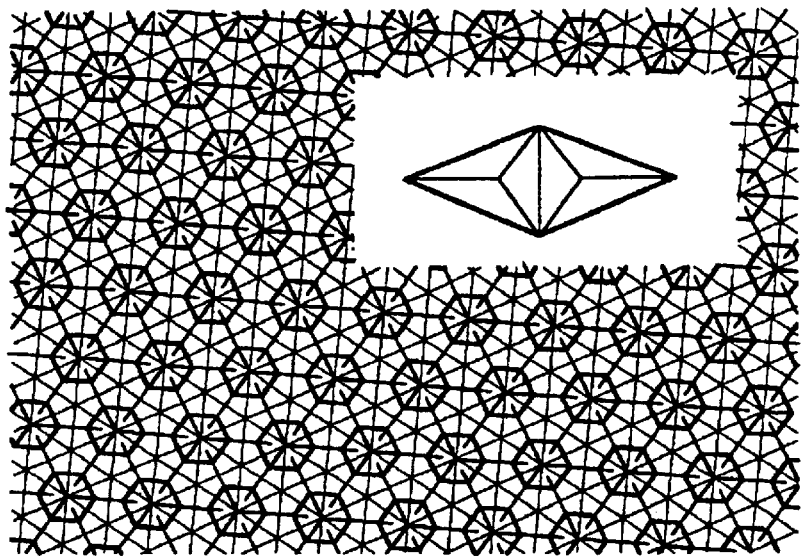
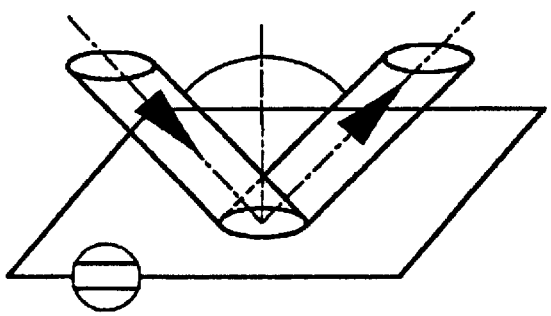
FIG. 5A
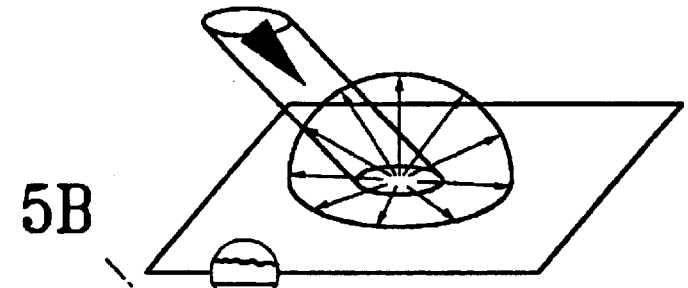
FIG. 5B
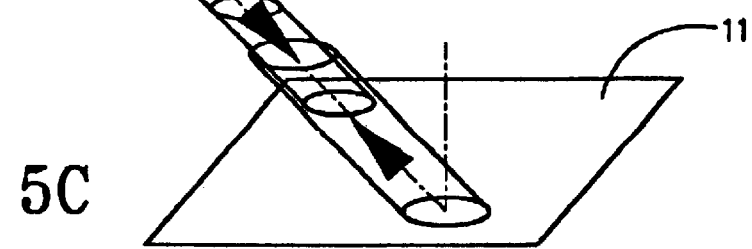
FIG. 5C

THIN RETROREFLECTIVE MARKER FOR IDENTIFYING AN OBJECT

This application is a continuation of U.S. Ser. No. 08/833,032, filed on Apr. 13, 1997, now U.S. Pat. No. 5,986,838, which is CIP of U.S. Ser. No. 08/388,242, filed on Feb. 14, 1995, now U.S. Pat. No. 5,638,228.

BACKGROUND OF THE INVENTION

1. Field of the Invention

The present invention relates to a marker for identifying an object in a system which includes a source of irradiance and a detector of light reflected from the marker. More particularly, the present invention relates to a removable data storage cartridge and to a data storage drive for receiving the cartridge. Even more particularly, the present invention relates to detecting the presence of the correct disk cartridge in the data storage drive by use of a retroreflective marker on the cartridge.

2. Description of the Prior Art and the Problems Solved by the Invention

Disk drives for receiving removable disk cartridges, including conventional 3.5" floppy disk drives, must have some mechanism for detecting the insertion or presence of a disk cartridge in the drive. The actuator that carries the recording heads of the disk drive across the recording surfaces of the disk should not be allowed to move unless the presence of a disk cartridge is detected. In the prior art, mechanical switches are typically employed to detect the presence of a disk cartridge within the drive. Such switches are typically positioned such that when a disk cartridge is inserted fully into the drive, the cartridge contacts the switch, thereby providing an indication that the disk cartridge is present.

The above identified parent application entitled "Retroreflective Marker for Data Storage Cartridge" describes the reflection of a highly concentrated quasi circular lobe of light whose spread on reflection is captured by the aperture of a phototransistor in close proximity to a light emitting diode (LED). This emitter/detector pair is in the drive and a retroreflective array is on the cartridge. The desired light lobe size is provided by the geometric size of the retroreflector array elements relative to the spacing of the emitter and the detector in the drive. Due to this physical size matching and the fact that retroreflectors are used, this marker on the cartridge is quite insensitive to cartridge tilt and distance from the emitter/detector pair in the drive.

Recently, very small mini-cartridges have been developed for use in miniature disc drives. These mini-drives are incorporated into hand-held devices such as digital cameras, electronic books, global positioning systems, cellular phones and the like. "INTERCHANGEABLE CARTRIDGE DATA STORAGE SYSTEM FOR DEVICE PERFORMING DIVERSE FUNCTIONS", U.S. Ser. No. 08/746,085 filed Nov. 11, 1996, Edwards, et al. now U.S. Pat. No. 5,809,320 (Attorney's Docket IOM-9319) describes such mini-cartridges, mini-drives, and hand-held devices. This application is incorporated herein by reference.

The mini-cartridge's data storage disk has a total thickness of about 2.5 mm. As disk storage products become smaller and smaller the need for a cartridge marker of thinner physical size is required. The aforementioned mini-cartridge has such a requirement. The present invention provides a solution to this requirement while maintaining the functionality of the retroreflector invention.

The ability to discriminate between cartridge types after insertion into a data storage device but prior to putting the read/write heads on the recording media is of significant value and utility. Principally this utility comes from the ability to detect the difference between various capacities or generations of data storage cartridges in a downward media compatible data storage drive. This discrimination capability allows for drive/media specific adjustments to be made such as media rotation rate, data channel rates, location of Z track for initial seeking, or even mechanical adjustment in the drive like the active engagement of new crash stop locations.

A "caddy" cartridge, as mentioned in the aforementioned Edwards, et al. application provides cross drive platform compatibility, for example between mini-cartridges and personal computer cartridges. The ability to recognize the installation of a "caddy" into the drive prior to spinning up of the "caddy" and loading of heads is necessary. Again rotational speed adjustments, Z track location information, data channel rate and crash stop/ID and OD data track location information must be determined prior to read/write head loading. This invention provides a solution of these problems also.

Another problem associated with the detection of LED light reflected from any reflective material is the occurrence of illuminance hot spots or structure in the LED output which often results in uneven illumination of the cartridge marker. Since these are typically randomly located the effect on the amplitude of the reflected return is variable. A smoothing or homogenizing of reflected light in this type of system would be a significant improvement in system to system reliability.

SUMMARY OF THE INVENTION

In accordance with the present invention, an object such as a data storage cartridge has an identifying marker which includes a very thin sheet of plastic retroreflective material. The marker reflects irradiance from a source back toward the source for detection by a detector to thereby identify the object as being suitable for use in the system.

The use of a very thin retroreflective material such as Reflexite (0.006" period) causes reflection of almost all of the light back into the source LED. In accordance with the invention a planer surface relief optical structure is placed in front of the retroreflective material. This element provides the appropriate redirection upon reflection of the light to the location of the light sensing detector.

The term "planar surface relief optical structure (PSROS) refers to thin substrates such as optically clear plastic or glass which have one or both of their surfaces modified from planar to one of texture or varying thickness. These surface relief structures can produce diffractive or refractive reshaping of the incident wavefront of light. Ruled or holographic diffraction gratings, for example are planar surface relief devices. Other names for planar surface relief structures include binary optics and holographic light shaping diffusers. Typical methods for providing this texturing or relief patterning is the use of mechanical ruling engines for the ruled gratings and photolithographic techniques for holographic diffraction gratings. Mass production of these master planar surface relief optical structures includes embossing, casting injection modeling, and thermal transfer techniques. Mass produced PSROS are typically made of plastic.

In the embodiments of this invention the PSROS is configured such that after the emitting light source wavefront is transmitted through the PSROS in one direction and reflected off the micro retroreflective structure and then again retransmitted through the PSROS the aggregate effect on the wavefront is to reshape it such that light is brought back to a predetermined location where a light detector is placed. This detector has a fixed location and orientation relative to the light emitter. This location and orientation remain a constant within the effective cone angle of the retroreflective array material no matter where the retroreflective marker is placed in a lateral plane which is a fixed distance from the retroreflective marker as long as the lateral angular orientation between the light source/detectors and the marker remains fixed. As the marker is rotated laterally relative to the emitter/detectors the reflected wavefronts orientation also rotates in unison.

Use of a light diffusing surface relief hologram provides this function. A reflected ellipse of light is sent back toward the emitter/detectors with a predetermined orientation relative to the emitter and hence a detector is placed appropriately such that this light may be detected to determine marker presence. Due to the reflection orientation or geometric location of this light the type of marker being used may be detected. Hence there is detection with a high signal to noise level and discrimination between types of markers due to geometric orientation.

Another embodiment of this invention uses a planar surface relief diffraction grating or a pair of these elements (blazed grating and a holographic grating) to reshape the wavefront such that the reflected light is brought back as a spot or multiple spots to one or multiple detectors such that both the detection and discrimination functions or utilities are obtained.

A surface relief holograph is produced by holographic construction of randomized refractive structures. These micron size features are able to provide a high efficiency diffusion element which can be directionally oriented. The degree of angular diffusion in orthogonal axes can be made to be different by using this technique. By use of the hologram a significant amount of the reflected light is directed into the aperture of the detector.

In accordance with one embodiment of the invention, the retroreflective material is laminated on the cartridge and the holographic material is laminated over the retroreflector. In accordance with another embodiment of the invention, a plastic sheet is formed with the retroreflector on one surface and the hologram on the opposite surface.

Further in accordance with the invention, the PSROS is a light shaping diffuser which homogenizes the reflection of light even if the illumination profile is quite irregular. Hot spots in the light output are obliterated. Further in accordance with the invention, the PSROS can provide wavefront reshaping using diffractive or refractive manipulation of the light using one or more of the many subset PSROS techniques such as holographic light shaping diffusers, ruled or blazed diffraction grating, binary optics, holographic diffraction grating or micro refractive lens array technology.

The foregoing and other objects, features, and advantages of the invention will be better understood from the following more detailed description and appended claims.

SHORT DESCRIPTION OF THE DRAWINGS

FIG. 4 is a photomicrograph of a retroreflective material suitable for use in accordance with the invention;

FIGS. 5A–5C depict the reflection of light from a smooth surface, from a rough surface, and from a retroreflector, respectively;

Figure 8A:
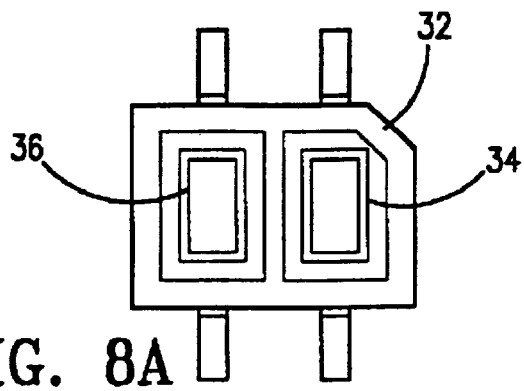
Figure 8C:
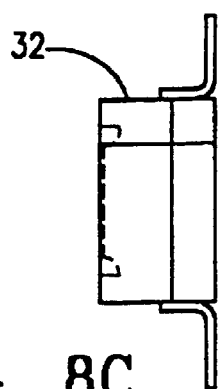
Figure 8B:
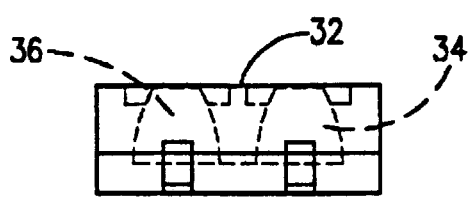

FIGS. 8A–8C respectively show top, side and edge views of an emitter/detector pair positioned in the drive to detect the retroreflective marker;

FIGS. 9A–9D show top, edge, and sideviews and an electrical schematic of an emitter/detector system suitable for use in the drives; and FIGS. 10A–10D show the descriminatable retroreflective states using a LED/detector system such as that of FIG. 9.

DESCRIPTION OF THE PREFERRED EMBODIMENT

Figure 1:
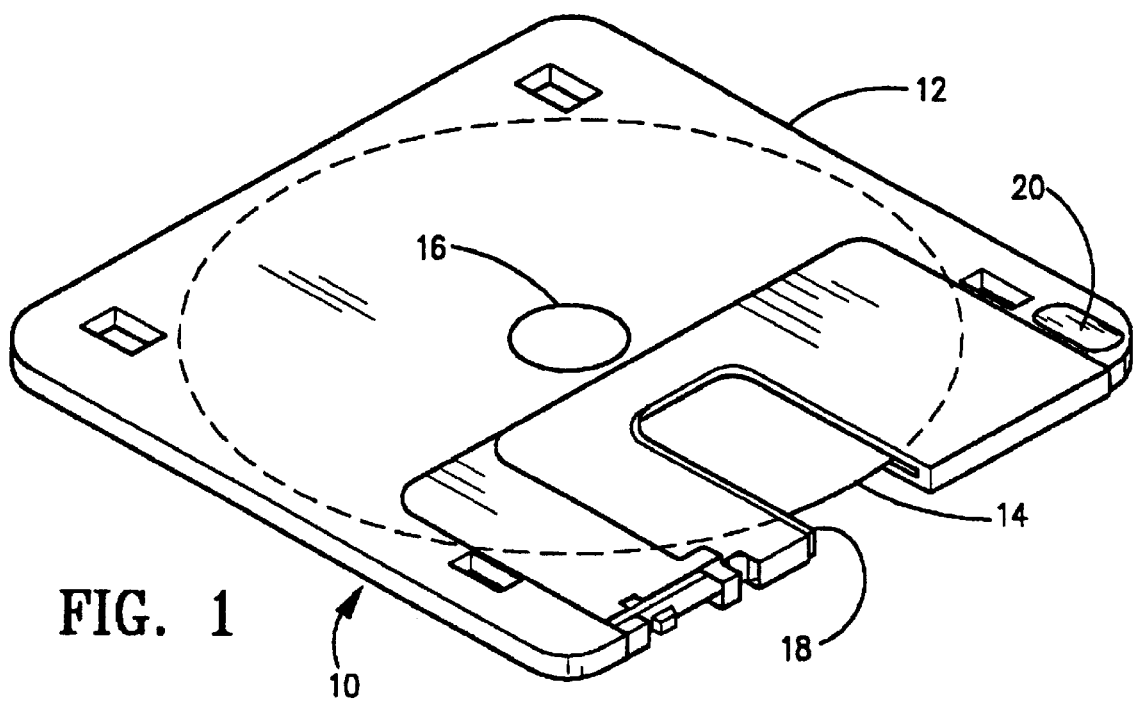
FIG. 1 shows the data storage cartridge of the present invention.
Figure 2:
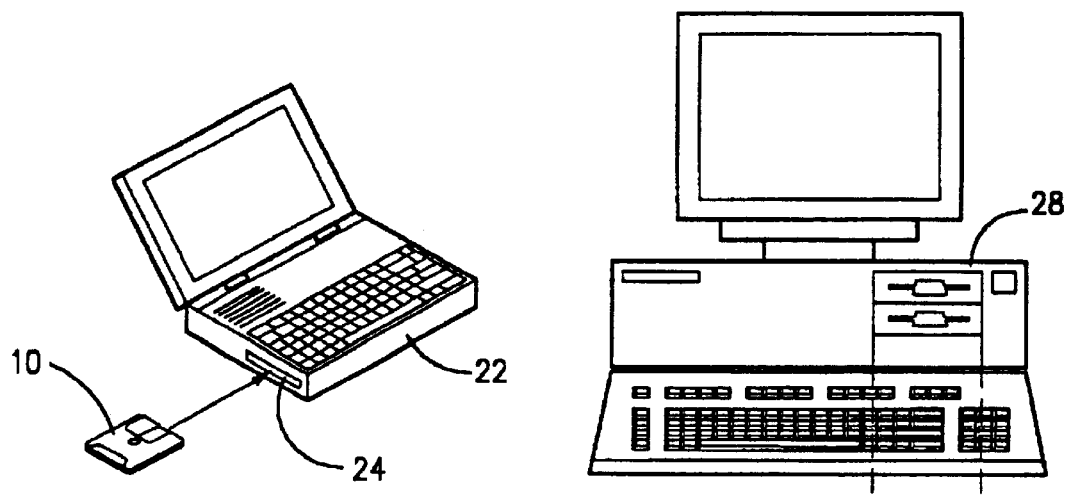
FIG. 2 is a perspective view of a device having a mini-disk drive of the type in which the invention is used.
Figure 3:
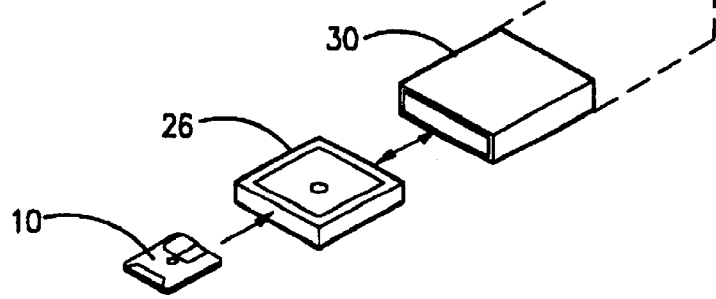
FIG. 3 shows of how the mini-disk drive of FIG. 2 is compatible with a disk drive in a personal computer system.

FIGS. 1–3 show the cartridge and the disk drive to which the present invention is applicable. The cartridge and drive are described in the co-pending application entitled "Interchangeable Cartridge Data Storage Device For Performing Diverse Functions", U.S. Ser. No. 08/746,085, filed Nov. 6, 1996 (Attorney Docket No. IOM-9319). This disclosure is incorporated herein by reference.

The disk cartridge 10 comprises an outer casing 12 and a disk-shaped recording medium 14 which is affixed to a hub 16 that is rotatably mounted in the casing 12. An opening on the bottom shell of the casing 12 provides access to the disk hub 16. A head access opening in the front peripheral edge 18 of the disk cartridge 10 provides access to the recording surfaces of the disk by the recording heads of a disk drive.

In accordance with the present invention, a retroreflective marker, or tag, 20 is positioned on the cartridge to be detected by the detector in the disk drive.

FIG. 2 shows a lap top computer 22 which has a mini-disk drive 24 for receiving the disk cartridge 10 of FIG. 1. FIG. 3 shows how a caddy 26 provides forward compatibility to a host computer 28. Caddy 26 adapts the mini-cartridge 10 to a personal computer drive 30. The drive 30 may be the Iomega ZIP drive which is disclosed and claimed in U.S. Patents identified in the parent application.

The retroreflective marker 20 on the mini-cartridge 10 must be very thin in order for the cartridge to fit in the thin form factor of the mini drive. In order to obtain a much thinner form factor for this cartridge, a thin sheet of plastic retroreflective material is used in the principle embodiment of this invention. Material suitable for use is described in Jacobs, S. F. "Experiments with retrodirective arrays," *Optical Engineering*. Vol. 21 No. 2, March/April 1982, and in Reflexite Corporation Brochure NA2020, Pub. 4/93. "Reflectors for Photoelectric Controls." One suitable material is referred to as Reflexite. It has corner cube retroreflectors with a nominal size or diameter of 0.006". There are about 47,000 retroreflectors per square inch of material. Although Reflexite is presently preferred, any dimensionally small retroreflective material can be used. FIG. 4 shows a photo micrograph of the miniature corner cube retroreflective material.

FIGS. 5A–5C illustrate retroreflection versus other modes of reflection. As shown in FIG. 5A, a smooth reflector will reflect light at an angle equal to the angle of incidence. As shown in FIG. 5B, a rough or specular reflector reflects light in all directions. FIG. 5C depicts retroreflection wherein light from the emitter/detector system 32 is reflected from retroreflective marker 20 back toward the emitter/detector system 32. The corner cube structure of the reflectors on the marker 20 returns or reflects the light back at the emitting light source. The size of the retroreflector for these near field reflections (short working distances) has a dominant effect on the size of the reflected lobe of light seen back at the emitting source. For this application this lobe needs to be large enough to encompass the aperture of the detector in close proximity to the light source (LED). In the Zip drive this distance is on the order of 0.070". The width or size of the ZIP cartridge retroreflectors is 0.094" thereby providing sufficient overlap of returned light into the aperture of the detector. However, the thin retroreflective marker used on the mini cartridge will direct light back onto the emitter without illuminating the detector. If material of the dimensional size of Reflexite is used for the retroreflective marker almost all of the light from the LED is reflected back into the emitting aperture of the LED and none is incident onto the aperture of the detector. In order to appropriately redirect a significant portion of the reflected light into the aperture of the detector (phototransistor) a planar surface relief optical structure 34, is placed in front of the retroreflective material 36, as is shown in FIG. 6B. Holographic light shaping diffusers, ruled or blazed diffraction gratings, binary optics, holographic diffraction gratings or micro refractive lens arrays will perform the function of redirecting light into the aperture of the detector.

A surface relief hologram is produced by holographic construction of randomized refractive structures. These micron size features are able to provide a high efficiency diffusion element which can be directionally oriented. The degree of angular diffusion in orthogonal axes can be made to be different using this technique. Diffusion angles between 0.2 degrees and 100 degrees in either axis are possible. These light shaping diffusers are referred to as LSDs. The refractive nature of the LSD provides the broadband functionality. Diffraction devices are much more wavelength sensitive. Film type surface relief holographic technology also provides broad spectral band performance. The same marker will work equally well with a red LED or a near-IR LED. LSD's which are suitable for use are described in Leaner, J M, She, R., Petersen, J., "Holographic Light Shaping Diffuses," presented at: The Aerospace Lighting Institute, Advanced Seminar, Febuary 1994, Los Angeles, Calif. and in Physical Optics Corporation Brochure JL1-493, "Light Shaping Diffusers."

By placing an LSD 34 in front of the retroreflective material the size and orientation of the reflected distribution of light can be controlled quite accurately. This distribution of reflected light at the emitter/detector pair is a function of both the diffusion angle of the LSD and the distance between this reflective marker and the emitter/detector pair.

Figure 6A:
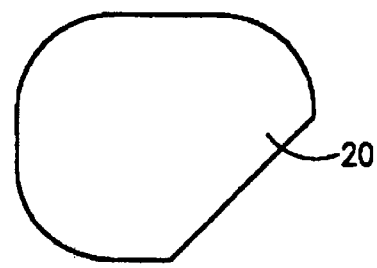
FIGS. 6A, 6B and 6C show a plan view, an edge view and an exploded perspective view of one embodiment of the invention.
Figure 6B:
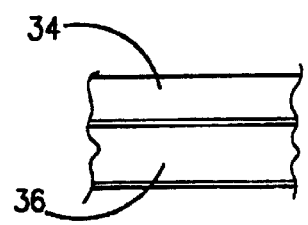
Figure 6C:
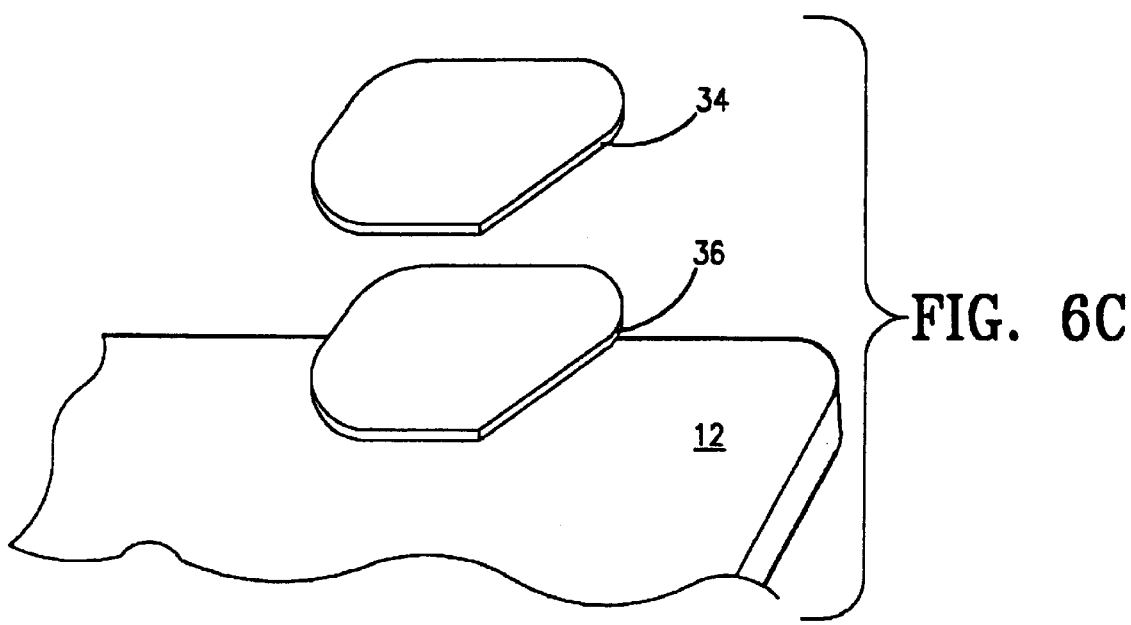
Figure 7:
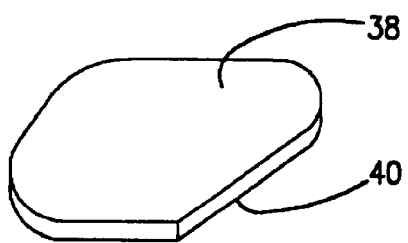
FIG. 7 shows another embodiment of the invention.

FIGS. 6A–6C show a thin marker which, in one embodiment, is only 0.4 mm thick. Thinner embodiments are possible using different types of optical films. The embodiment shown in 6A–6C uses an optically clear adhesive to laminate the LSD film 34 to the Reflexite film 36. Another embodiment, shown in FIG. 7, has only one sheet of thin plastic. The LSD 38 is embossed on one side and the micro-retroreflective array 40 is embossed on the other side.

The figures in the Physical Optics Corporations Brochure JL1-493 "Light Shaping Diffusers" illustrate the homogenizing effect of the LSD on a structured illuminance source. An LSD in combination with the Reflexite material provides not only an accurately placed distribution of light, but also it provides a homogenized reflection of the LED light source even if there is significant structure in its illumination profile. Hot spots in the output are obliterated.

FIGS. 8A–8C show the layout of a suitable emitter/detector pair 32 which includes LED 34 and phototransistor 36.

Because the diffusion angles of the LSD can be made significantly different from one axis to another an elliptical distribution of light can be redirected back at the detector. The figures in the Physical Optics Corporation Brochure also illustrate this bi-axial differential diffusion ability. This ability in combination with the addition of more than one detector element in close proximity to the LED emitter allows for detection of the spatial orientation of the marker's reflected light and hence cartridge type discrimination.

Figure 9A:
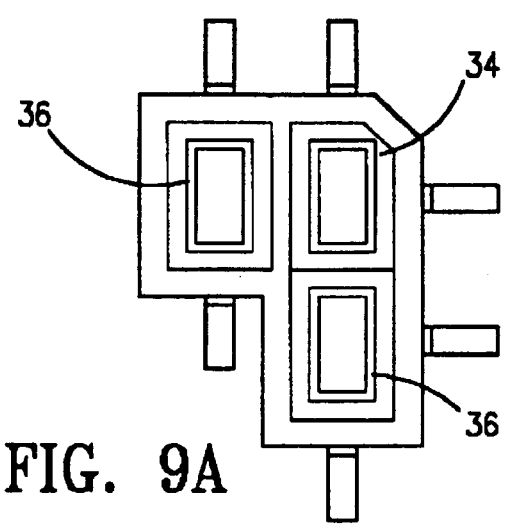
Figure 9C:
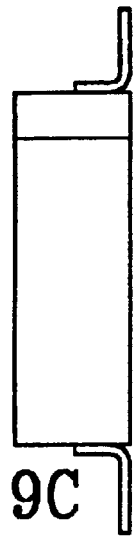
Figure 9B:
Figure 9D:
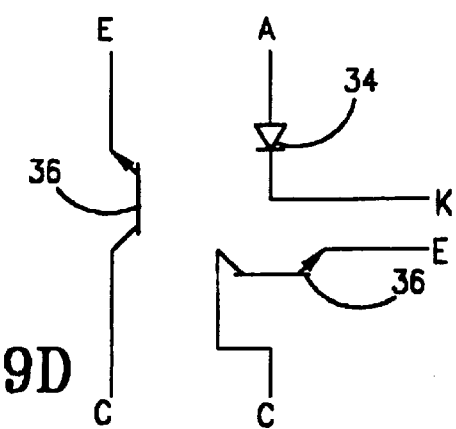

FIGS. 9A–9D depict an emitter/detector system which includes two detectors 36 and an emitter 34. FIG. 9D depicts the electrical components with the legends E for emitter, C for collector, A for anode, and K for cathode. The "emitter/detector system" includes two light detectors (phototransistors) 36 which are on orthogonal axes in close proximity to the LED light source 34.

Figure 10A:
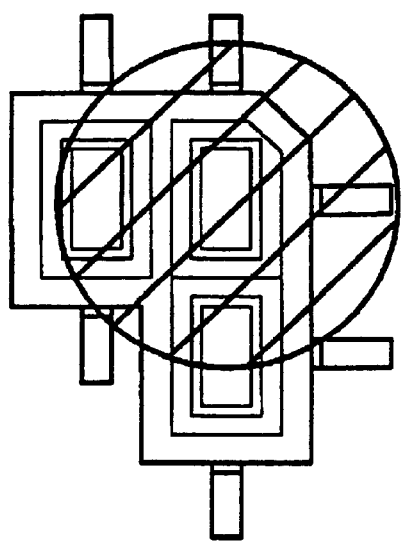
Figure 10B:
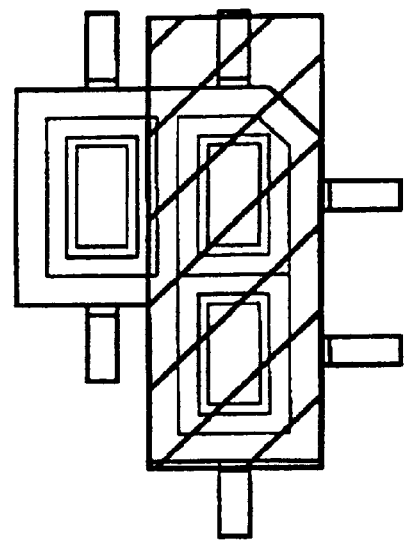
Figure 10C:
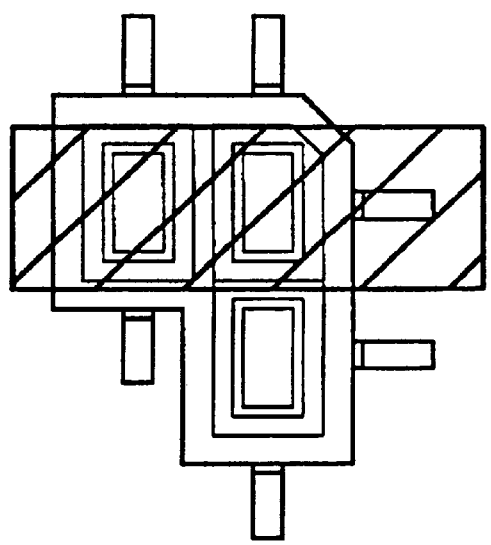
Figure 10D:
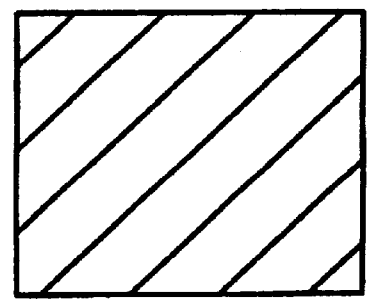

FIGS. 10A–10D illustrate the three possible detectable or discriminatable states using the two (2) orthogonally placed detectors. State 1 is shown in FIG. 10A, state 2 in FIG. 10B and state 3 in FIG. 10C. FIG. 10D shows the legend for the reflected light distributions in FIGS. 10A–10C. An example of the application of this three state system would be in a future higher capacity ZIP drive. "State 1" would alert to the insertion of a ZIP 100 cartridge, "State 2" would alert to the insertion of a ZIP 200+ cartridge and, "State 3" would alert to the insertion of a mini-cartridge "caddy".

Addition of a third detector element allows for the detection and discrimination of 7 possible states. Any number of multiple detectors arrayed around the light emitting source provide an exponentially increasing number of descririnatable states.

In one embodiment which has been described, the hologram produces an elongated pattern of illumination by orientation of the angle of diffusion. Alternatively, the reflected light might be a spot or multiple spots oriented relative to the emitter in a desired manner to provide appropriate detection and discrimination functionality or utility.

While particular embodiments have been shown and described various modifications may be made. The appended claims are, therefore, intended to cover all embodiments within the true spirit and scope of the invention.

What is claimed is:

1. In a system for identifying an object by a source of irradiance and a detector of said irradiance, said object comprising:

a body; and a marker on said body including a retroreflective material which reflects irradiance from said source back toward said source for detection by said detector; and a surface relief holograph in the path of said irradiance back toward said source to redirect light toward said detector to identify said object.

2. A system for identifying an object by a source of irradiance and a detector of said irradiance, said object comprising:

a body; and a marker on said body including a retroreflective material which reflects irradiance from said source back toward said source for detection by said detector; and a holographic light shaping diffuser on said body in the path of said irradiance back toward said source to redirect light toward said detector to identify said object.

3. A system for identifying an object by a source of irradiance and a detector of said irradiance, said object comprising:

a body; and a marker on said body including a retroreflective material which reflects irradiance from said source back toward said source for detection by said detector; and a ruled diffraction grating on said body in the path of said irradiance back toward said source to redirect light toward said detector to identify said object.

4. A system for identifing an object by a source of irradiance and a detector of said irradiance, said object comprising:

a body; and a marker on said body including a retroreflective material which reflects irradiance from said source back toward said source for detection by said detector; and a blazed diffraction grating on said body in the path of said irradiance back toward said source to redirect light toward said detector to identify said object.

5. A system for identifying an object by a source of irradiance and a detector of said irradiance, said object comprising:

a body; and a marker on said body including a retroreflective material which reflects irradiance from said source back toward said source for detection by said detector; and includes binary optics on said body in the path of said irradiance back toward said source to redirect light toward said detector to identify said object.

6. A system for identifying an object by a source of irradiance and a detector of said irradiance, said object comprising:

a body; and a marker on said body including a retroreflective material which reflects irradiance from said source back toward said source for detection by said detector; and a holographic diffraction grating on said body in the path of said irradiance back toward said source to redirect light toward said detector to identify said object.

7. A cartridge for a data storage drive which has a source of irradiance and a detector of said irradiance for determining whether the cartridge is suitable for use in said drive, said cartridge comprising:

a body; and a marker on said body, said marker being a reflector which reflects irradiance from said source back toward said source for detection by said detector which thereby identifies said cartridge as being suitable for use in that drive; and a planar surface relief optical structure in the path of said irradiance back toward said source, said optical structure being a white light hologram.

8. A cartridge for a data storage drive which has a source of irradiance and a detector of said irradiance for determining whether the cartridge is suitable for use in said drive said cartridge comprising:

a body; and a marker on said body, said marker being a reflector which reflects irradiance from said source back toward said source for detection by said detector which thereby identifies said cartridge as being suitable for use in that drive; and a planar surface relief optical structure in the path of said irradiance back toward said source, said optical structure being a surface relief hologram.

9. The cartridge recited in claim 8 wherein said hologram produces an elliptical pattern of light.

10. The cartridge recited in claim 8 wherein said surface relief hologram is constructed of random refractive structures.

11. The cartridge recited in claim 10 wherein said structures provide a directionally oriented defusion element.

12. The cartridge recited in claim 11 wherein said hologram produces an elongated pattern of illumination the orientation said directionally oriented defusion element establishing of the angle of defusion of said pattern.

13. The cartridge recited in claim 12 wherein said angle of defusion is between 0.2 and 100°.

14. The cartridge recited in claim 12 wherein the orientation of the hologram on the cartridge uniquely identifies said cartridge by the orientation of the elongated pattern of light.

15. A cartridge for a data storage drive which has a source of irradiance and a detector of said irradiance for determining whether the cartridge is suitable for use in said drive, said cartridge comprising:

a body; and a marker on said body, said marker being a reflector which reflects irradiance from said source back toward said source for detection by said detector which thereby identifies said cartridge as being suitable for use in that drive; and a planar surface relief optical structure in the path of said irradiance back toward said source, said reflector is a retroreflective material having periodic elements which reflect light upon its incident path and wherein said optical structure expands reflective irradiance into a pattern beyond the pattern of incident light.

16. A cartridge for a data storage drive which has a source of irradiance and a detector of said irradiance for determining whether the cartridge is suitable for use in said drive, said cartridge comprising:

a body; and a marker on said body, said marker being a reflector which reflects irradiance from said source back toward said source for detection by said detector which thereby identifies said cartridge as being suitable for use in that drive; and a planar surface relief optical structure in the path of said irradiance back toward said source, said marker being a plastic film having a retroreflective pattern embossed on one surface thereof and having said optical structure embossed on the opposite surface thereof.

17. A cartridge for a data storage drive which has a source of irradiance and a detector of said irradiance for determining whether the cartridge is suitable for use in said drive, said cartridge comprising:

a body; and a marker on said body, said marker being a reflector which reflects irradiance from said source back toward said source for detection by said detector which thereby identifies said cartridge as being suitable for use in that drive; and a planar surface relief optical structure in the path of said irradiance back toward said source, said retroreflective material having approximately 47,000 periodic elements per square inch.

18. A cartridge for a data storage drive which has a source of irradiance and a detector of said irradiance for determining whether the cartridge is suitable for use in said drive, said cartridge comprising:

a body; and a marker on said body, said marker being a reflector which reflects irradiance from said source back toward said source for detection by said detector which thereby identifies said cartridge as being suitable for use in that drive; and a planar surface relief optical structure in the path of said irradiance back toward said source, said planar surface relief optical structure being a holographic light shaping diffuser.

19. A cartridge for a data storage drive which has a source of irradiance and a detector of said irradiance for determining whether the cartridge is suitable for use in said drive, said cartridge comprising:

a body; and a marker on said body, said marker being a reflector which reflects irradiance from said source back toward said source for detection by said detector which thereby identifies said cartridge as being suitable for use in that drive; and a planar surface relief optical structure in the path of said irradiance back toward said source, said planar surface relief optical structure being a ruled diffraction grating.

20. A cartridge for a data storage drive which has a source of irradiance and a detector of said irradiance for determining whether the cartridge is suitable for use in said drive, said cartridge comprising:

a body; and a marker on said body, said marker being a reflector which reflects irradiance from said source back toward said source for detection by said detector which thereby identifies said cartridge as being suitable for use in that drive; and a planar surface relief optical structure in the path of said irradiance back toward said source, said planar surface relief optical structure being a blazed diffraction grating.

21. A cartridge for a data storage drive which has a source of irradiance and a detector of said irradiance for determining whether the cartridge is suitable for use in said drive, said cartridge comprising:

a body; and a marker on said body, said marker being a reflector which reflects irradiance from said source back toward said source for detection by said detector which thereby identifies said cartridge as being suitable for use in that drive; and a planar surface relief optical structure in the path of said irradiance back toward said source, said planar surface relief optical structure including binary optics.

22. A cartridge for a data storage drive which has a source of irradiance and a detector of said irradiance for determining whether the cartridge is suitable for use in said drive, said cartridge comprising:

a body; and a marker on said body, said marker being a reflector which reflects irradiance from said source back toward said source for detection by said detector which thereby identifies said cartridge as being suitable for use in that drive; and a planar surface relief optical structure in the path of said irradiance back toward said source, said planar surface relief optical structure being a holographic diffraction grating.

23. A cartridge for a data storage drive which has a source of irradiance and a detector of said irradiance for determining whether the cartridge is suitable for use in said drive, said cartridge comprising:

a body; and a marker on said body, said marker being a reflector which reflects irradiance from said source back toward said source for detection by said detector which thereby identifies said cartridge as being suitable for use in that drive; and a planar surface relief optical structure in the path of said irradiance back toward said source, said planar surface relief optical structure being a micro refractive lens array.

24. The combination of:

a source of irradiance;

a detector of said irradiance; a retroreflective array which reflects irradiance from said source back toward such source; and a surface relief optical structure in the path of said irradiance back toward said source to control spatially the reflection of light relative to said source, said planar surface relief optical structure being a holographic light shaping diffuser.

25. The combination of:

a source of irradiance;

a detector of said irradiance; a retroreflective array which reflects irradiance from said source back toward such source; and a surface relief optical structure in the path of said irradiance back toward said source to control spatially the reflection of light relative to said source, said planar surface relief optical structure being a ruled diffraction grating.

26. The combination of:

a source of irradiance;

a detector of said irradiance; a retroreflective array which reflects irradiance from said source back toward such source; and a surface relief optical structure in the path of said irradiance back toward said source to control spatially the reflection of light relative to said source, planar surface relief optical structure being a blazed diffraction grating.

27. The combination of:

a source of irradiance;

a detector of said irradiance; a retroreflective array which reflects irradiance from said source back toward such source; and a surface relief optical structure in the path of said irradiance back toward said source to control spatially the reflection of light relative to said source, said planar surface relief optical structure including binary optics.

28. The combination of:

a source of irradiance;

a detector of said irradiance; a retroreflective array which reflects irradiance from said source back toward such source; and a surface relief optical structure in the path of said irradiance back toward said source to control spatially the reflection of light relative to said source, said planar surface relief optical structure a holographic diffraction grating.

29. The combination of:

a source of irradiance;

a detector of said irradiance; a retroreflective array which reflects irradiance from said source back toward such source; and a surface relief optical structure in the path of said irradiance back toward said source to control spatially the reflection of light relative to said source, said planar surface relief optical structure being a micro refractive lens array.

30. The combination of:

a source of irradiance;

a detector of said irradiance; a retroreflective array which reflects irradiance from said source back toward such source; and a surface relief optical structure in the path of said irradiance back toward said source to control spatially the reflection of light relative to said source, a plurality of said detectors arranged to detect the orientation of said reflected light whereby the illumination of particular ones of said detectors identifies a unique property of said combination.

* * * * *